(12) United States Patent
Sedlar

(10) Patent No.: US 9,175,774 B2
(45) Date of Patent: Nov. 3, 2015

(54) RADIAL SHAFT SEAL, RADIAL SHAFT SEAL ASSEMBLY AND METHOD OF INSTALLATION

(71) Applicant: Federal-Mogul Corporation, Southfield, MI (US)

(72) Inventor: Brent Sedlar, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 361 days.

(21) Appl. No.: 13/660,766

(22) Filed: Oct. 25, 2012

(65) Prior Publication Data

US 2013/0111729 A1    May 9, 2013

Related U.S. Application Data

(60) Provisional application No. 61/551,583, filed on Oct. 26, 2011.

(51) Int. Cl.
*F16J 15/32* (2006.01)

(52) U.S. Cl.
CPC ............. *F16J 15/32* (2013.01); *F16J 15/3224* (2013.01); *F16J 15/3244* (2013.01); *F16J 15/3268* (2013.01); *Y10T 29/4987* (2015.01); *Y10T 29/49826* (2015.01)

(58) Field of Classification Search
CPC ..... F16J 15/32; F16J 15/3244; F16J 15/3224; F16J 15/3268; Y10T 29/4987; Y10T 29/49826
See application file for complete search history.

(56) References Cited

U.S. PATENT DOCUMENTS

| 4,283,063 | A | 8/1981 | Prescott |
| 4,695,063 | A | 9/1987 | Schmitt et al. |
| 6,715,768 | B1 | 4/2004 | Bock et al. |
| 2007/0057472 | A1 | 3/2007 | Hatch |
| 2008/0217865 | A1 | 9/2008 | Sedlar et al. |
| 2010/0187768 | A1 | 7/2010 | Sedlar et al. |
| 2010/0187769 | A1 | 7/2010 | Sedlar et al. |

OTHER PUBLICATIONS

International Search Report mailed Feb. 13, 2013 (PCT/US2012/062015).

*Primary Examiner* — John C Hong
(74) *Attorney, Agent, or Firm* — Robert L. Stearns; Dickinson Wright, PLLC

(57) ABSTRACT

A radial shaft seal, method of installation thereof, and seal assembly are provided. The seal includes a mounting portion and a seal lip having a sealing surface extending between an oil side end and a free air side end. An annular bridge extends from the oil side end to the mounting portion in radially overlying relation with the seal lip. An annular installation lip extends from the free air side end toward an air side of the seal. The installation lip has an inner surface spaced radially outwardly from the sealing surface and has an end portion that diverges radially outwardly toward the air side of the seal. The installation lip engages the shaft to promote the seal lip to slide over the shaft without unfolding the seal lip, and then springs radially outwardly from the shaft to remain out of contact with the shaft during use.

13 Claims, 4 Drawing Sheets

RADIAL SHAFT SEAL, RADIAL SHAFT SEAL ASSEMBLY AND METHOD OF INSTALLATION

CROSS-REFERENCE TO RELATED APPLICATIONS

This application claims the benefit of U.S. Provisional Application Ser. No. 61/551,583, filed Oct. 26, 2011, which is incorporated herein by reference in its entirety.

BACKGROUND OF THE INVENTION

1. Technical Field

This invention relates generally to dynamic oil seals of the type for creating a fluid tight seal between a rotating shaft and housing.

2. Related Art

Dynamic radial shaft oil seals are designed to have a so-called "oil side" of the seal and an "air side." These designations pertain to the orientation of the seal when installed, with the oil side facing the interior of the housing and in communication with the oil, whereas the air side faces outwardly and is exposed to the air.

There are at least two different ways in which a radial shaft oil seal can be installed. An "air side installation" is one type of assembly in which the seal is first installed into the bore of the housing and the shaft (or its wear sleeve) is thereafter installed from the air side axially into the seal assembly (in the direction inward of the housing) to effect the seal. An "oil side installation" is the other way of assembly where the housing and shaft are already present and the seal assembly is slid axially into the housing and simultaneously onto the shaft (or its wear sleeve), such that the shaft enters the seal assembly from the oil side of the seal. Otherwise, "oil-side" installation requires the seal assembly to be installed into the housing, also referred to as carrier, and then the housing, with seal installed therein, is assembled to an engine over the "all ready in place" shaft wherein the shaft enters the seal from the oil side of the seal.

During installation, regardless of the type, the seals must be able to withstand the axial loads resulting during installation without causing a seal lip of the seal to reverse fold or otherwise become displaced to a position where the seal lip is ineffective in the fully installed condition.

Radial shaft seals are also subject to varying axial pressures that can be seen during leak testing or in use. The pressure differential developed across the seal (across the oil and air sides of the seal) can impart an axial load on the seal in one direction or the other (a vacuum or increased pressure in the housing) and can cause the seal to pull away from the shaft to at least some degree, and in extreme cases can cause the seal to reverse fold and collapse under the pressure so that the seal against the shaft or wear sleeve is broken.

SUMMARY OF THE INVENTION

In general terms, this invention provides a radial shaft seal assembly having features that facilitate making a proper air side installation, even in conditions of shaft-to-bore misalignment.

In accordance with one presently preferred aspect of the invention, a radial shaft seal configured for receipt in a housing and about a shaft to sealingly isolate an air side of the shaft seal from an oil side of the shaft seal is provided. The radial shaft seal includes an annular mounting portion and a seal lip. The seal lip has an annular sealing surface facing radially inwardly and an opposite backing surface facing radially outwardly. The sealing surface extends between an oil side end and a free air side end. The sealing surface is configured having a predetermined inner diameter such that the sealing surface, when moved to its sealing configuration, extends along a cylindrical path in sealed engagement with a running surface of the shaft. An annular bridge is connected to the oil side end of the seal lip by a first hinge and operably to the mounting portion by a second hinge. The bridge extends from the first hinge to the second hinge in radially overlying relation to the seal lip. An annular installation lip extends axially from the free air side end of the seal lip toward the air side of the shaft seal. The installation lip has an inner surface spaced radially outwardly from the sealing surface and an outer most surface. The inner surface is configured to remain out of contact with the shaft running surface during use and has at least an end portion that frustroconical as viewed in axial cross-section diverging radially outwardly toward the air side of the shaft seal. The installation lip prevents the seal lip from inverting during the air side installation process by ensuring the free air side of the seal lip runs up and slides over the running surface of the shaft, thereby ensuring that the sealing surface of the seal lip attains its proper sealing contact with the shaft running surface while the installation lips remains out of contact with the shaft running surface.

In accordance with another aspect of the invention, a radial shaft seal assembly is provided. The radial shaft seal assembly includes a shaft, extending along a central axis and providing a running surface having a predetermined diameter, and a radial shaft seal configured for receipt in a housing and about the shaft to sealingly isolate an air side of the radial shaft seal from an oil side of the radial shaft seal. The radial shaft seal includes an annular mounting portion and a seal lip having an annular sealing surface facing radially inwardly and an opposite backing surface facing radially outwardly. The sealing surface and backing surface extend between an oil side end of the seal lip and a free air side end of the seal lip. An annular bridge is attached to the oil side end of the seal lip by a first hinge and to the mounting portion by a second hinge. The bridge extends from the first hinge to the second hinge in radially overlying relation to the seal lip. An annular installation lip extends axially from the free air side end of the seal lip toward the air side of the shaft seal. The installation lip has an inner surface spaced radially outwardly from the sealing surface and an outermost surface. The inner surface is configured to remain out of running contact with the shaft running surface upon installation of the shaft through the shaft seal and has at least an end portion that is frustroconical as viewed in axial cross-section diverging radially outwardly toward the air side of the shaft seal. The installation lip prevents the seal lip from inverting during the air side installation process of the inserting the shaft through the shaft seal by ensuring the air side of the seal lip runs up and slides over the running surface of the shaft, and thereafter automatically springing away from the shaft running surface, thereby ensuring that the sealing surface of the seal lip attains its proper sealing contact with the shaft running surface.

In accordance with another aspect of the invention, a method of installing a radial shaft seal onto a shaft in an air side assembly process is provided. The method includes providing a shaft having a running surface and providing a radial shaft seal with a seal lip having an annular sealing surface extending from an oil side end of the seal lip to a free air side end of the seal lip. The method further includes providing the radial shaft seal having an annular installation lip extending axially from the free air side end of the seal lip toward the air side of the shaft seal, with an innermost surface of the installation lip being spaced radially outwardly from the sealing surface. The installation lip being provided having a portion that is frustroconical as viewed in axial cross-section and diverging radially outwardly toward the air side of the shaft seal. The method further including moving the shaft and the radial shaft seal axially toward one another and bringing the installation lip of the seal lip into abutment with an end of the shaft. Further, bringing the sealing surface into sealing engagement with the running surface while concurrently causing the installation lip to move automatically out of contact with the running surface.

In accordance with another aspect of the method of installing a radial shaft seal onto a shaft in an air side assembly process, the method further includes providing the radial shaft seal having an annular bridge extending from the oil side end of the seal lip to an outer mounting portion such that the bridge extends in radially overlying relation with the seal lip.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
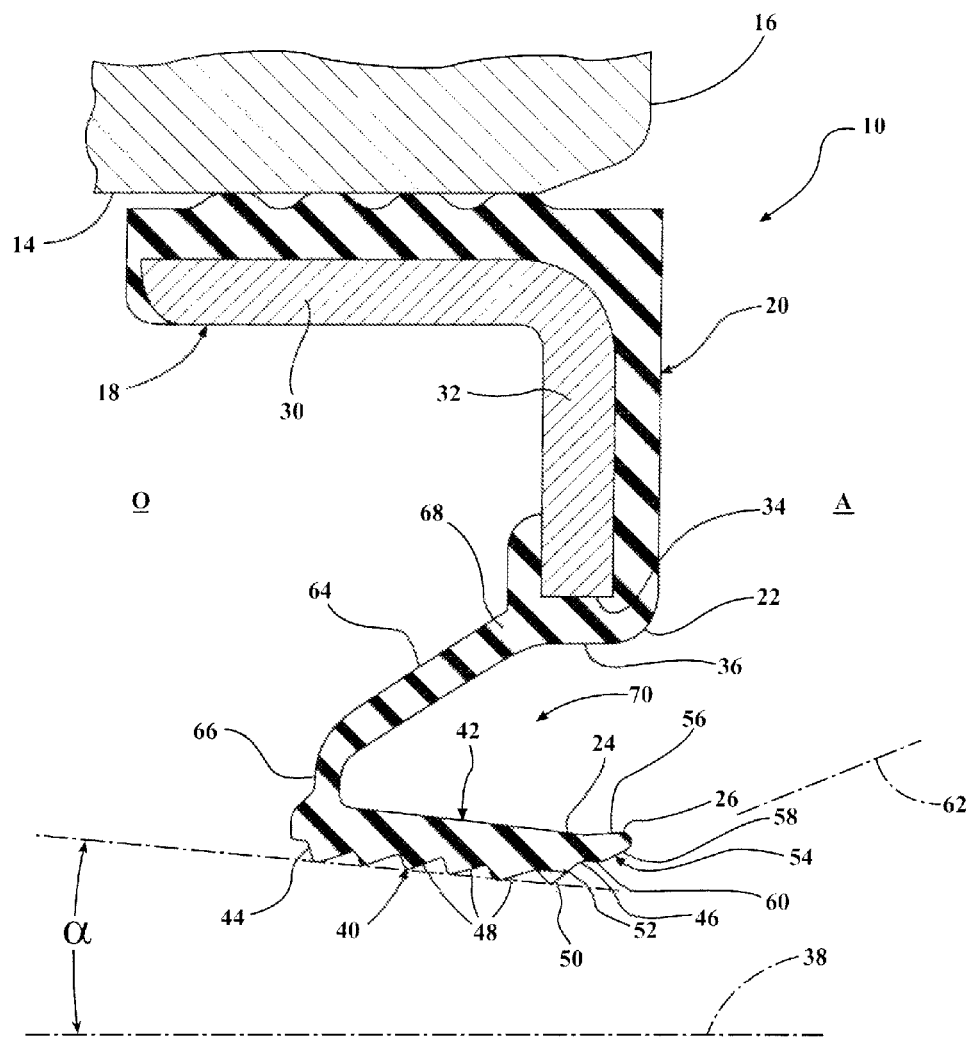
FIG. 1 is a cross-sectional view of a radial shaft seal constructed according to one aspect of the invention shown installed in an outer housing with a seal lip of the radial shaft seal being shown relaxed and uninstalled about a shaft.

Referring in more detail to the drawings, FIG. 1 illustrates a radial shaft seal, referred to hereafter as seal 10, constructed in accordance with one aspect of the invention. The seal 10 is well suited for use in a crankcase application, by way of example and without limitation, for sealing about a rotatable shaft 12, as part of a radial shaft seal and shaft assembly 13 (FIG. 5), extending through a bore 14 of a housing 16, such as a crankcase, in which the seal 10 is installed. Otherwise, the seal 10 can be installed into a carrier housing, whereupon the carrier housing and seal 10 can be attached to the engine. The seal 10 has an oil side O and an axially opposite air side A, wherein the oil and air sides are in relation to the orientation of the seal 10 when installed, with the oil side O facing to the interior of the crankcase 16 and the air side A facing to the outside environment. The seal 10 includes a mounting portion 18, also referred to as a case, core or collar, provided as a metal annulus or ring structure, to which an elastomeric seal material 20 is attached. The seal material 20 is formed to provide an elastomeric seal body 22 with an axially extending seal lip 24 that exhibits low dynamic frictional contact with the shaft 12 during use, thereby resulting in a low torque between the shaft 12 and the seal lip 24. An annular installation lip 26 extends axially from the seal lip 24 toward the air side A. The installation lip 26 prevents the seal lip 24 from inverting during an air side installation of the shaft 12 through the seal 10 by ensuring the seal lip 24 runs up and slides onto a running surface 28 of the shaft 12 as intended, thereby ensuring that the seal lip 24 attains its proper sealing contact with the shaft running surface 28.

The mounting portion 18 may be generally L-shaped in axial cross-section, as illustrated, or may take on any number of configurations, such as ring-shaped, C-shaped or S-shaped, depending upon the requirements of a particular application. The L-shaped mounting portion 18 has a cylindrical outer wall 30 and a radially inwardly extending annular leg 32. The mounting portion 18 is shown covered, at least in part, with the elastomeric seal material 20. In the embodiment illustrated, the elastomeric seal material 20 is bonded on a radially outwardly facing outer surface of the outer wall 30, wherein this portion of the seal material 20 may be contoured with undulations to provide a snug and fluid tight installation in the bore 14 of the crankcase 16. The elastomeric seal material 20 is also shown as extending along the leg 32 of the mounting portion 18 on a side of the leg facing the air side A, and is further shown as extending around a radially innermost free end 34 of the leg 32 to cover a portion of a side of the leg 32 facing the oil side O, thereby forming a central portion 36 of the seal body 22 radially inwardly from and radially aligned with the leg 32.

Figure 1A:
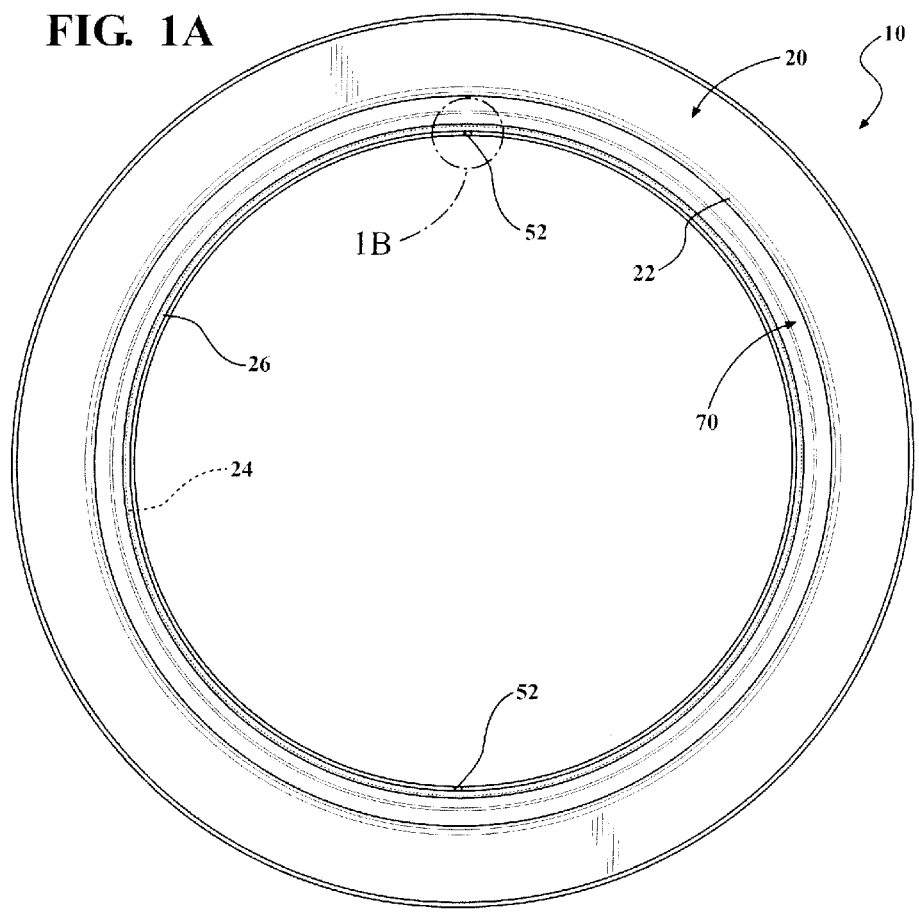
FIG. 1A is an end view of the radial shaft seal of FIG. 1
Figure 1B:
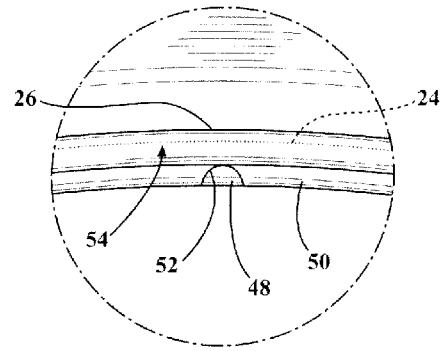
FIG. 1B is an enlarged view of the encircled area 1B of FIG. 1A.

The seal lip 24, when in the relaxed, uninstalled state (FIG. 1), extends slightly angled by a few degrees from a horizontal central axis 38 of the seal 10, as shown by angel α, wherein α is between about 1-10 degrees. As such, the seal lip 24 converges slightly radially inwardly toward the air side A when in a relaxed state. The entire seal lip 24 is shown as being radially aligned with a portion of the mounting portion 18, thereby providing the seal 10 with a narrow, space saving profile. The seal lip 24 has an annular, radially inwardly facing sealing surface 40 and an opposite, radially outwardly facing backing surface 42 extending between an oil side end 44 facing the oil side O and a free air side end 46 of the seal lip 24 facing the air side A. The entire sealing surface 40, when installed on the shaft and during use, is maintained in sealing engagement with the running surface 28 of the shaft 12. The sealing surface 40 can be configured having hydrodynamic features 48, in the form of ribs or a continuous thread, that act to pump oil back to the oil side O of the seal 10 during rotation of the shaft 12. Further, the free air side end 46 of the sealing surface 40 can be provided with a dust exclusion band 50 that facilitates preventing the ingress of contamination from the air-side A to the oil-side O of the seal assembly 10, and further, facilitates maintaining the lubricant on the oil-side O of the assembly 10. The dust exclusion band 50, as illustrated, can include one or a plurality of vent features, such as a two equidistantly spaced vents 52 (FIG. 1A), by way of example, to allow the pressure under the sealing surface 40 of the seal lip 24 to remain balanced or substantially balanced with the pressure on the air side A of the seal 10 during use, thereby avoiding the buildup of a vacuum under the seal lip 24, and thus, facilitating reduced friction and a reduced running torque.

The installation lip 26 extends from the free air side end 46 of the seal lip 24 toward the air side A of the seal 10, and is shown as being radially aligned with the leg 32 of the mounting portion 18, further contributing the narrow, space saving profile of the seal 10. The installation lip 26 has a radially inwardly facing inner surface 54 and a radially outwardly facing outer surface 56 (only labeled in FIG. 1 to avoid cluttering the remaining Figures). The inner surface 54 is, in its entirety, spaced radially outwardly from the sealing surface 40. Accordingly, the inner surface 54 is configured to remain out of running contact with the shaft running surface 28 upon installation and during rotation of the shaft 12 within the seal 10. As such, the inner surface does not produce friction or drag during use. The inner surface 54 has at least a portion, represented as an end portion 58 (only labeled in FIG. 1), that is frustroconical, as viewed in axial cross-section, wherein the inner surface 54 of the end portion 58 tapers and diverges radially outwardly from the central axis 38 toward the air side A of the shaft seal 10, such as between about 20-40 degrees, and shown as being about 30 degrees, for example. The inner surface 54 is also shown having a generally cylindrical portion 60 (only labeled in FIG. 1) extending between the tapered end portion 58 and the free air side end 46, and thus, between the end portion 58 and the dust exclusion band 50. The inner diameter of the cylindrical portion 60 is greater than the inner diameter of the sealing surface 40. Accordingly, the entirety of the inner surface 54 is spaced radially outwardly from the sealing surface 40 thereby being assured of remaining out of running contact with the shaft 12 upon completing the air side assembly.

The outer surface 56 of the installation lip 26 is shown as transitioning from the cylindrical backing surface 42 of the seal lip 24, wherein the outer surface 56 is inclined upwardly and radially outwardly from the central axis 38 in oblique relation from the backing surface 42. The angle of inclination of the outer surface 56 is less than the angle of inclination of the end portion inner surface 58, such as between about 5-15 degrees, shown as being about 10 degrees, for example, and thus, the outer surface 56 and the inner surface 58 converge toward the air side A, thereby providing the installation lip 26 with a generally nose-shaped configuration. As such, the body of the installation lip 26 extends generally along a central axis 62 that diverges radially outwardly from the central axis 38 toward the air side A of the seal 10. The inclination of the outer surface 56 results in a slightly thickened configuration of the installation lip 26 in comparison if the outer surface 56 were not inclined radially outwardly. As such, the radially outwardly inclined outer surface 56 thickens and stiffens the lip 26 to provide enhanced resistance to bending during installation. As such, the installation lip 26 is able to act as a slightly stiffened skid during installation, thereby acting to properly guide the seal lip 24 over the shaft 12 during installation, rather than simply bending radially outwardly and being ineffective as a guide.

An annular bridge 64 operably connects the seal lip 24 to the mounting portion 18, and is shown as being connected to the seal body 22. The bridge 64 is connected to the oil side end 44 of the seal lip 24 by a first hinge 66 and to the central portion 36 of the seal body 22 by a second hinge 68. The bridge 64 extends at an angle to the horizontal central axis 38, such as between about 20-40 degrees, though the angle can range from 1-89 degrees from horizontal. The bridge 64 extends from the first hinge 66 to the second hinge 68 in radially aligned and overlying relation to the seal lip 24, such that the full length of the bridge 64 extends over the seal lip 24, and thus, provides an annular pocket 70 between the bridge 64 and the seal lip 24, wherein the pocket 70 faces and is open to the air side A of the seal assembly 10.

Figures 2, 3:
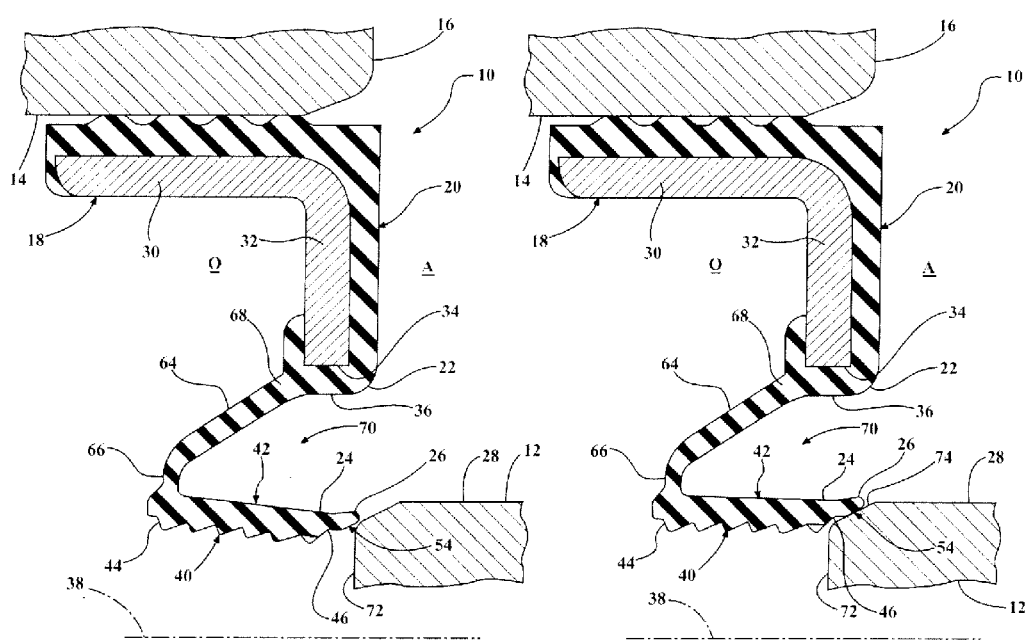
FIG. 2-5 are cross-sectional views of the seal of FIG. 1 shown disposed in the housing with a shaft being installed in progression from an air side of the seal.
Figure 4:
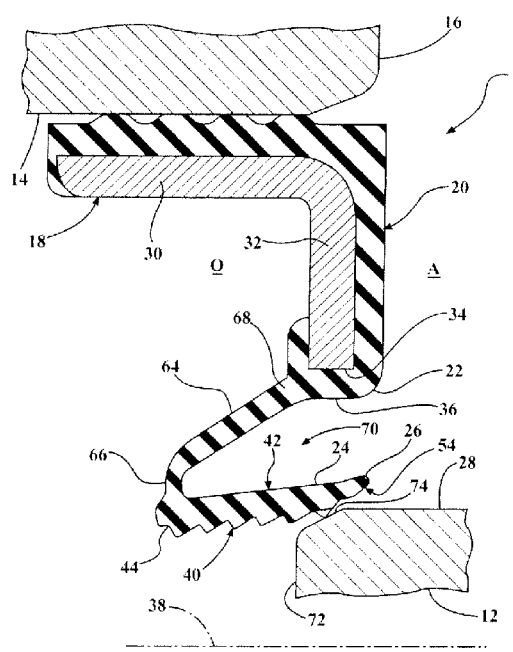
Figure 5:
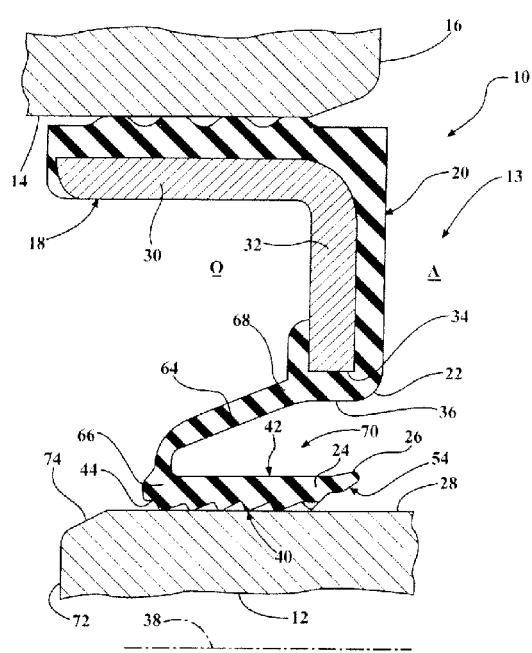

FIGS. 2-5 illustrate an air side installation progression of the shaft 12 through the seal 10. During installation, the seal 10 is already installed into the housing 16, with the shaft 12 thereafter being extended into the bore 14 of the housing 16 and through the seal 10. As the shaft 12 is slid axially into the bore 14, as shown in FIG. 3, an end 72 of the shaft 12, if not perfectly aligned coaxially with the seal 10, initially engages the inner surface 54 of the end portion 58 of the installation lip 26. To further facilitate assembly, the end 72 of the shaft 12 is configured having a lead-in tapered surface 74. As shown in FIG. 4, as the shaft 12 progresses axially from the air side A through the seal 10 toward the oil side O, the inner surface 54 slides up and over the end 72 of the shaft 12. As this is occurring, the seal lip 24 is caused to expand radially outwardly about the end 72 of the shaft 12 and the air side end 40 of the seal lip 24 is caused to pitch radially outwardly, such that a portion of the pocket 70 is caused to partially collapse, thereby reducing the axial installation force required to install the seal 10 about the shaft 12. As such, the installation lip 26 acts to bring the seal lip 24 into concentric alignment about the shaft 12 without causing the seal lip 24 to move substantially axially toward the oil side O, thereby avoiding a reverse unfolding of the seal lip 10. Accordingly, as shown in FIG. 5, upon full installation of the shaft 12 through the seal 10, the sealing surface 40 of the seal lip 24 takes on its proper sealing orientation against the running surface 28 of the shaft 12 without concern of the seal lip 24 inadvertently becoming unfolded. Further, upon bringing the sealing surface 40 into its proper sealing abutment with the shaft 12, the inner surface 54 of the installation lip 26 moves automatically radially outwardly in spaced relation from the running surface 28, thereby not generating any torque against the shaft running surface 28 during use.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft to sealingly isolate an air side of the shaft seal from an oil side of the shaft seal, comprising:
    an annular mounting portion;
    a seal lip having an annular sealing surface extending between an oil side end and a free air side end, said sealing surface being configured to extend axially along a running surface of the shaft;
    an annular bridge connected to said oil side end of said seal lip and operably to said mounting portion, said bridge extending in radially overlying relation with said seal lip; and
    an installation lip extending axially from said free air side end of said seal lip toward said air side of said shaft seal, said installation lip having an inner surface spaced radially outwardly from said sealing surface.

2. The radial shaft seal of claim 1 wherein said inner surface of said installation lip has an end portion that is frustro-conical as viewed in axial cross-section, said end portion diverging radially outwardly toward said air side of said shaft seal.

3. The radial shaft seal of claim 2 wherein said inner surface of said installation lip has a cylindrical portion extending between said end portion and said free air side end.

4. The radial shaft seal of claim 2 wherein said seal lip has a backing surface opposite said sealing surface said installation lip has an outer surface extending in oblique relation to said backing surface.

5. The radial shaft seal of claim 4 wherein said backing surface is cylindrical.

6. The radial shaft seal of claim 4 wherein said inner surface and said outer surface of said installation lip converge toward said air side.

7. The radial shaft seal of claim 1 wherein said installation lip is radially aligned with a portion of said mounting portion.

8. The radial shaft seal of claim 7 wherein said seal lip is radially aligned with a portion of said mounting portion.

9. A radial shaft seal assembly, said radial shaft seal assembly including a radial shaft seal configured for receipt in a housing to sealingly isolate an air side of said radial shaft seal from an oil side of said radial shaft seal in combination with a shaft extending along a central axis and providing a running surface having a predetermined diameter, said radial shaft seal comprising:
    an annular mounting portion;
    a seal lip having an annular sealing surface extending between an oil side end and a free air side end, said sealing surface being configured to extend axially along said running surface of said shaft;

an annular bridge connected to said oil side end of said seal lip and operably to said mounting portion, said bridge extending in radially overlying relation with said seal lip; and an installation lip extending axially from said free air side end of said seal lip toward said air side of said shaft seal, said installation lip having an inner surface spaced radially outwardly from said sealing surface and an outer most surface.

10. The radial shaft seal assembly of claim 9 wherein said inner surface of said installation lip has an end portion that is frustroconical as viewed in axial cross-section, said end portion diverging radially outwardly toward said air side of said shaft seal.

11. The radial shaft seal assembly of claim 10 wherein said inner surface of said installation lip has a cylindrical portion extending between said end portion and said free air side end.

12. The radial shaft seal assembly of claim 10 wherein said seal lip has a backing surface opposite said sealing surface said installation lip has an outer surface extending in oblique relation to said backing surface.

13. The radial shaft seal assembly of claim 12 wherein said inner surface and said outer surface of said installation lip converge toward said air side.

\* \* \* \* \*